United States Patent
Choi et al.

(10) Patent No.: US 7,089,574 B2
(45) Date of Patent: Aug. 8, 2006

(54) DISK CARTRIDGE

(75) Inventors: Han-kook Choi, Gyeonggi-do (KR); Yong-hoon Lee, Gyeonggi-do (KR); Hong-kyun Yim, Gyeonggi-do (KR); Jae-yong Eum, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 10/314,416

(22) Filed: Dec. 9, 2002

(65) Prior Publication Data

US 2003/0147342 A1    Aug. 7, 2003

(30) Foreign Application Priority Data

Feb. 1, 2002  (KR)  ................................. 2002-5878

(51) Int. Cl.
*G11B 23/02* (2006.01)

(52) U.S. Cl. ...................................................... 720/739

(58) Field of Classification Search ................ 369/291; 720/718, 719, 725, 728, 739; 360/133
See application file for complete search history.

(56) References Cited

U.S. PATENT DOCUMENTS 6,704,276 B1 * 3/2004 Quiachon, Jr. .............. 369/291
6,728,201 B1 * 4/2004 Takizawa et al. ........... 369/291
2004/0027985 A1 * 2/2004 Inoue ......................... 369/291

FOREIGN PATENT DOCUMENTS

| CN | 1318839 | 10/2001 |
|----|---------|---------|
| JP | 61-6974 | 1/1986 |
| JP | 6-215466 | 8/1994 |
| JP | 2001-332058 | 11/2001 |
| KR | 2001-82025 | 8/2001 |
| WO | 02/056313 | 7/2002 |

* cited by examiner

*Primary Examiner*—A. J. Heinz
*Assistant Examiner*—Mark Blouin
(74) *Attorney, Agent, or Firm*—Stein, McEwen & Bui, LLP

(57) ABSTRACT

A disk cartridge includes a case which receives a disk thereon, a cover which is installed on the case and includes an opening, and a shutter which is movably installed in the case, in a lower direction of the disk, to open and close an aperture formed on the case. The disk cartridge has guide holes formed on the case along a trace of the shutter, and support members formed on the shutter. The support members are guided along the guide holes while having ends thereof interfering with peripherals of the guide holes. Therefore, since the peripherals of the guide holes interfere with the ends of the support members, the shutter is prevented from being deformed even where an external force is applied to the shutter through the aperture, in a closed state of the shutter.

22 Claims, 9 Drawing Sheets

DISK CARTRIDGE

CROSS-REFERENCE TO RELATED APPLICATIONS

This application claims the benefit of Korean Patent Application No. 2002-5878 filed on Feb. 1, 2002, in the Korean Intellectual Property Office, the disclosure of which is incorporated herein by reference.

BACKGROUND OF THE INVENTION

1. Field of the Invention

The present invention relates to a disk cartridge, and more particularly, to a disk cartridge which stores a disk and protects a recording surface of the disk from contamination sources including dust and fingerprints.

2. Description of the Related Art

Generally, a disk cartridge stores a disk, which is an information recording/reproducing medium, and is mounted in a disk drive apparatus. FIG. 1 shows a conventional disk cartridge 100 comprising a case 101 which stores a disk D, a shutter 110 which is installed and rotated in the case 101 to selectively open or close an aperture 102 on the case 101, so as to allow a pickup (not shown) of a disk drive apparatus (not shown) to access the disk D, and a cover 103 which is fixed on an upper portion of the case 101.

An opening 103b is formed on the cover 103 to replace the disk D, and separation prevention levers 103a are installed and slide on the cover 103 to prevent the disk D from being separated through the opening 103b. To mount the disk D, the separation prevention levers 103a move backward so as not to interfere with the disk D. After the disk D has been mounted, the separation prevention levers 103a move forward, as shown in FIG. 1, so that respective front ends of the separation prevention levers 103a prevent the disk D from being separated through the opening 103b.

FIGS. 2A and 2B show plan views of the disk cartridge 100 of FIG. 1 where the disk cartridge 100 having the disk D is introduced into the disk drive apparatus. In response, an opening lever 130 of the disk drive apparatus pushes a locking piece 111a to release a protrusion 11c of the shutter 110 from a groove 101a of the case 101. Sequentially, the opening lever 120 pushes an interference piece 111b to rotate the shutter 110 as shown in FIG. 2B. In this case, the shutter 110 is formed of first and second shutter units 111 and 112, which are installed and rotated on rotation shafts 110a, and engage each other by an interlock saw tooth portion 113. Therefore, where the first shutter unit 111 integrally connected to the interference piece 111b rotates in, for example, a clockwise direction, the second shutter unit 112 rotates in a counterclockwise direction so as to have the first and second shutter units 111 and 112 open the aperture 102. Thus, the pickup of the disk drive apparatus can access a recording surface of the disk D through the aperture 102 to record/reproduce information. Although not shown in the drawings, a torsion spring is installed on the rotation shaft 110a, between the first shutter unit 111 and a surface of the case 101 to elastically bias the first shutter unit 111 in a counterclockwise direction, i.e., in a direction to close the aperture 102. Consequently, where a force applied to the opening lever 120 is removed, the shutter 110 returns to a closed state.

In such a structure, a force applied to the shutter 110 through the aperture 102 easily deforms the shutter 110 where the shutter 110 is closed. In other words, since only one end of the shutter 110 is coupled to the rotation shafts 110a, while a user pushes the other side of the shutter 110 through the aperture 102, the shutter 110 may be deformed. Accordingly, the shutter 110 is not smoothly opened or closed and a gap may occur between the first and second shutter units 111 and 112. Therefore, the shutter 110 cannot properly perform as a shutter to open and close the aperture 102 of the case 101.

Additionally, since the shutter 110 is installed in the case 101 so as to mount the disk D on the shutter 110, the recording surface of the disk D, i.e., a lower surface of the disk D in the drawings, may contact the shutter 110 during an opening and closing of the shutter 110. Thus, scratches may occur on the recording surface of the disk D.

Therefore, a structure of a disk cartridge which prevents deformation of a shutter and protects a recording surface of a disk during opening and closing operations of the shutter is required.

SUMMARY OF THE INVENTION

Accordingly, it is an aspect of the present invention to provide a disk cartridge which stably stores a disk and prevents deformation of a shutter in response to an external force applied to the shutter.

Additional aspects and advantages of the invention will be set forth in part in the description which follows and, in part, will be obvious from the description, or may be learned by practice of the invention.

To achieve the above and/or other aspects of the present invention, there is provided a disk cartridge comprising a case to store a disk therein and having an aperture to access a portion of the disk, a cover installed on the case and having an opening, a shutter movably installed in the case to selectively open and close the aperture formed on the case, guide holes formed on the case along a movable trace of the shutter, and support members formed on the shutter to be guided into the corresponding guide holes, wherein the support members include ends thereof which are interfered by respective peripheral regions of the guide holes.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
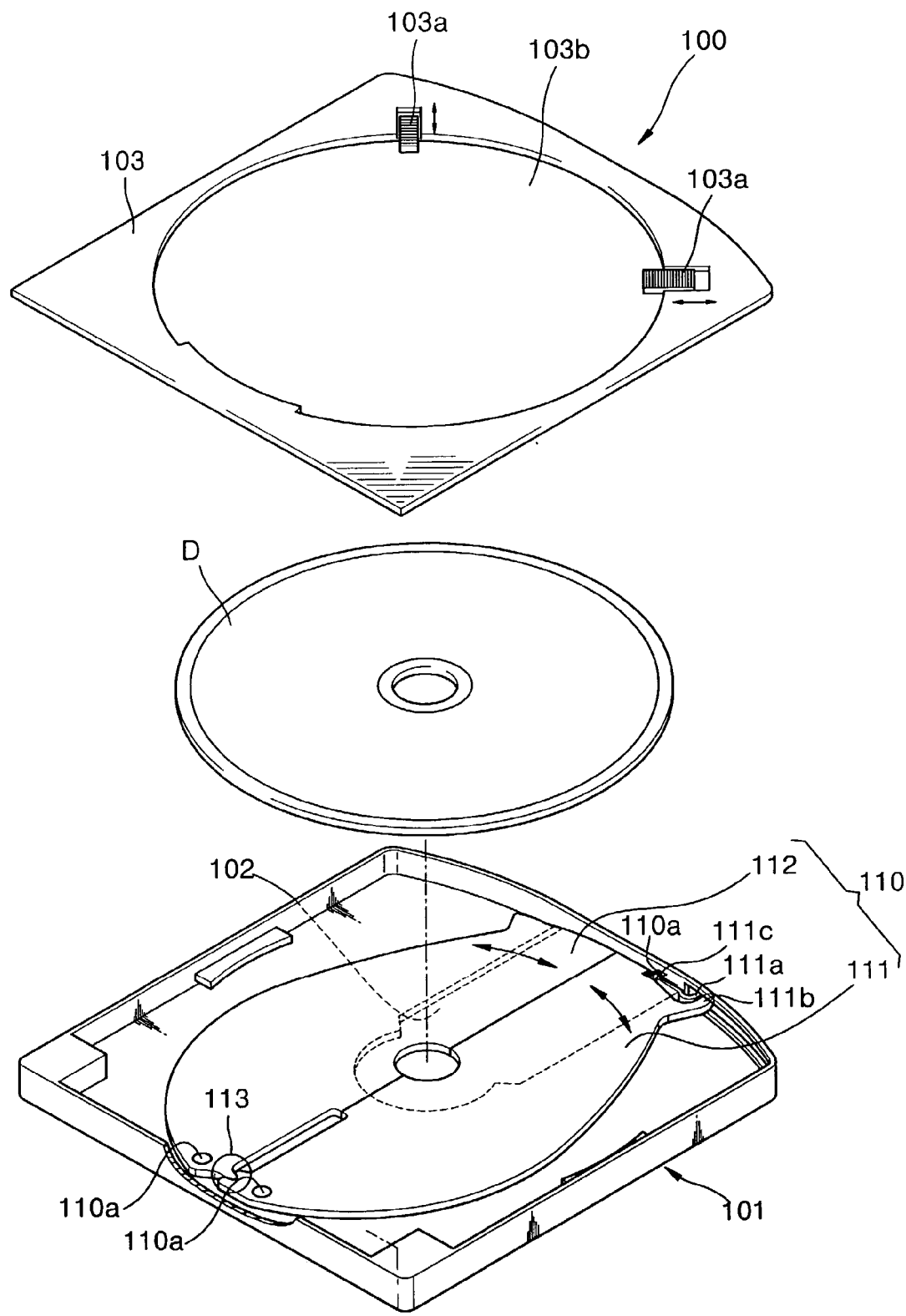
FIG. 1 is an exploded perspective view of a conventional disk cartridge.
Figure 2A:
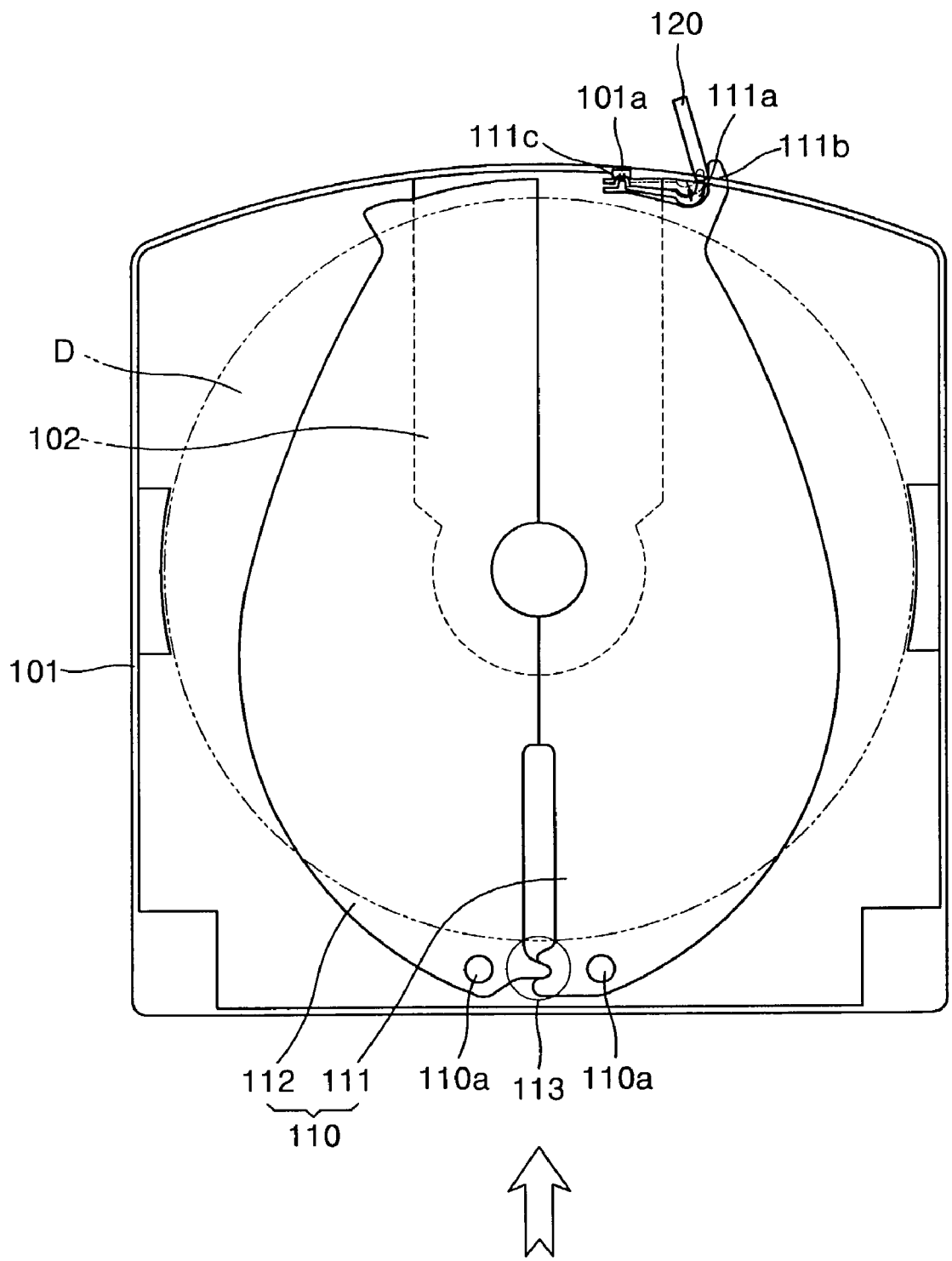
FIGS. 2A and 2B are plan views illustrating opened and closed states of a shutter of the disk cartridge of FIG. 1.
Figure 2B:
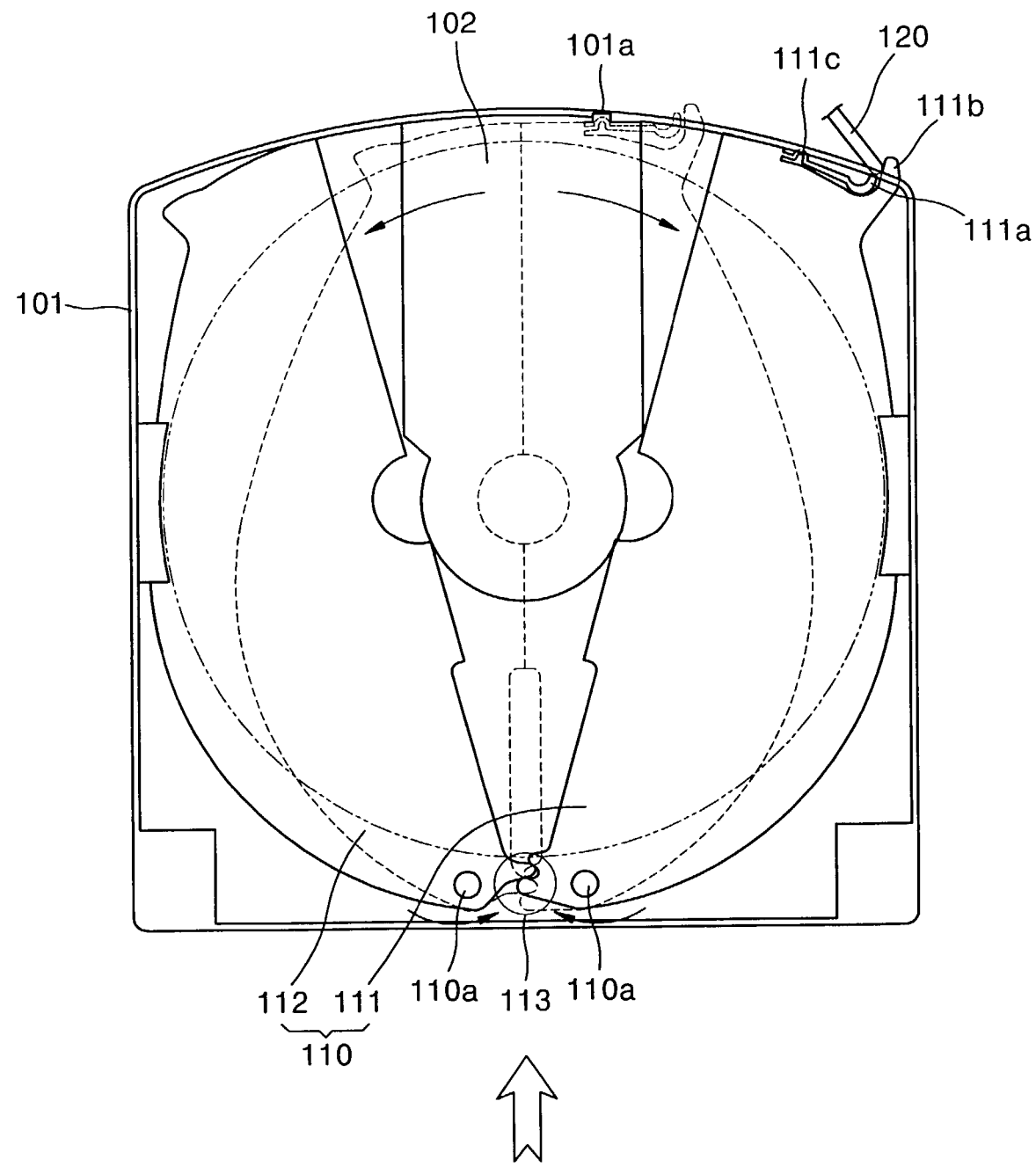

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
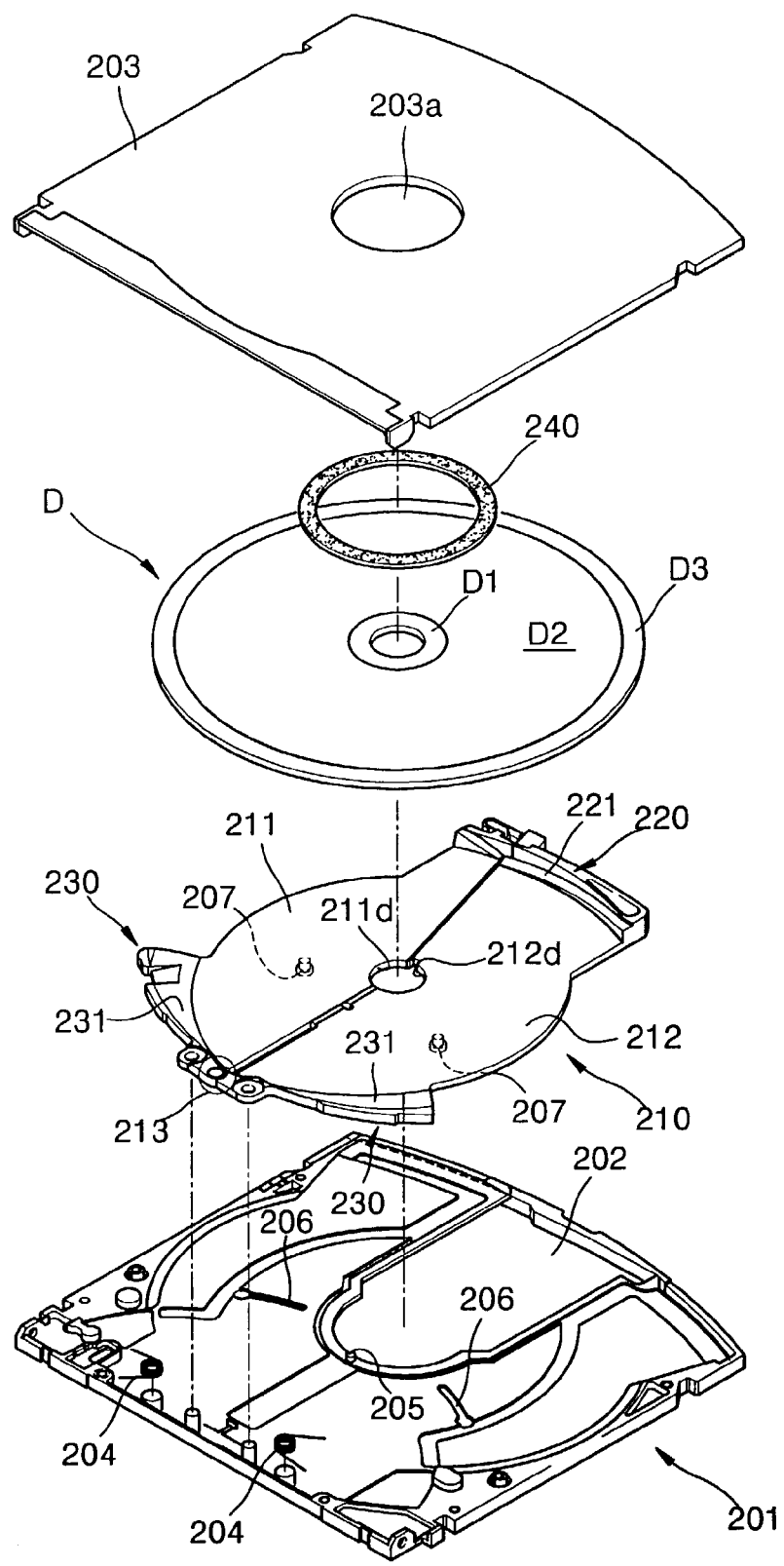
FIG. 3 is an exploded perspective view of a disk cartridge according to an embodiment of the present invention.
Figure 4:
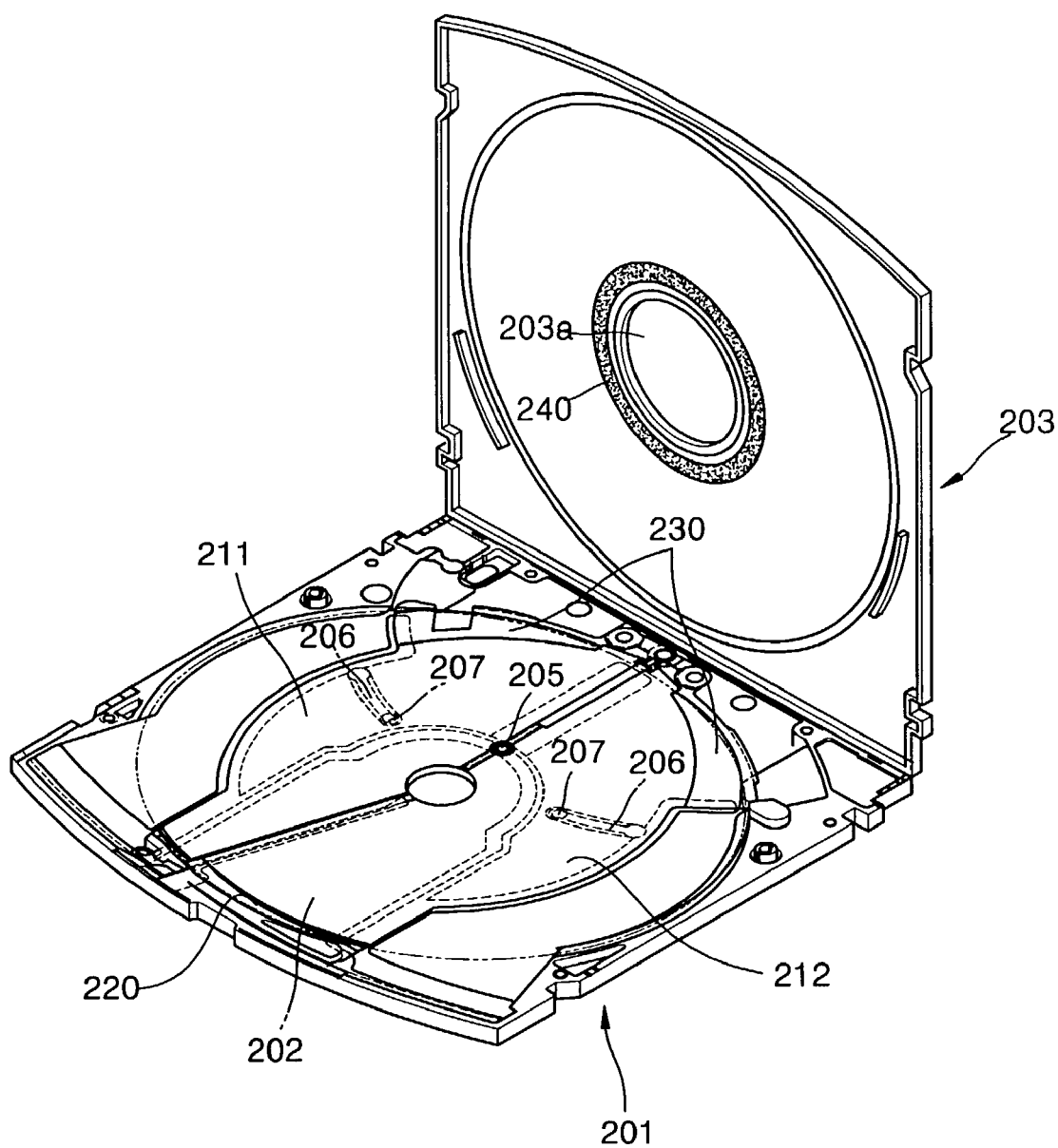
FIG. 4 is a perspective view of the disk cartridge of FIG. 3.
Figure 5:
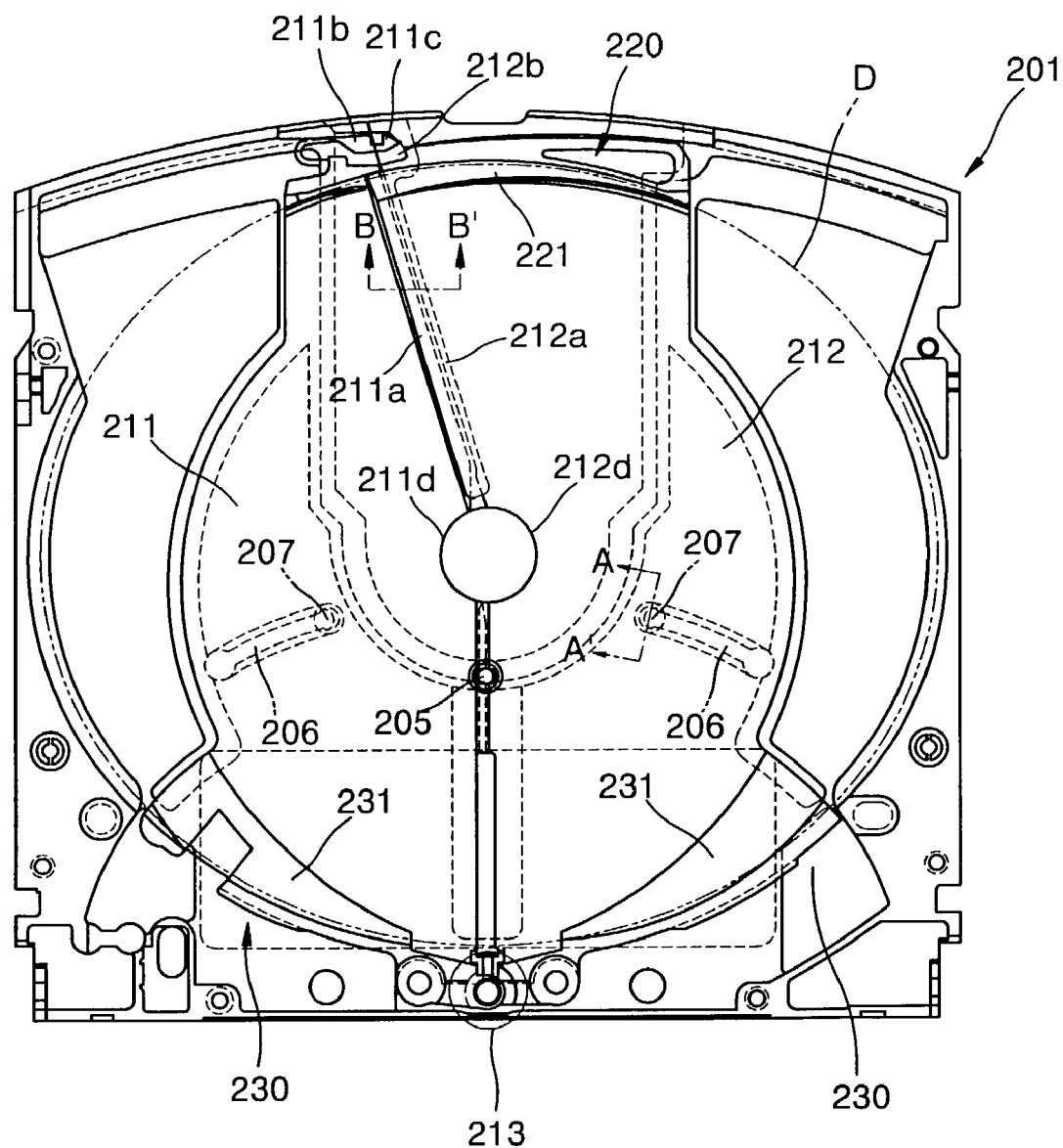
FIG. 5 is a plan view illustrating a closed state of a shutter of the disk cartridge shown in FIG. 3.
Figure 6:
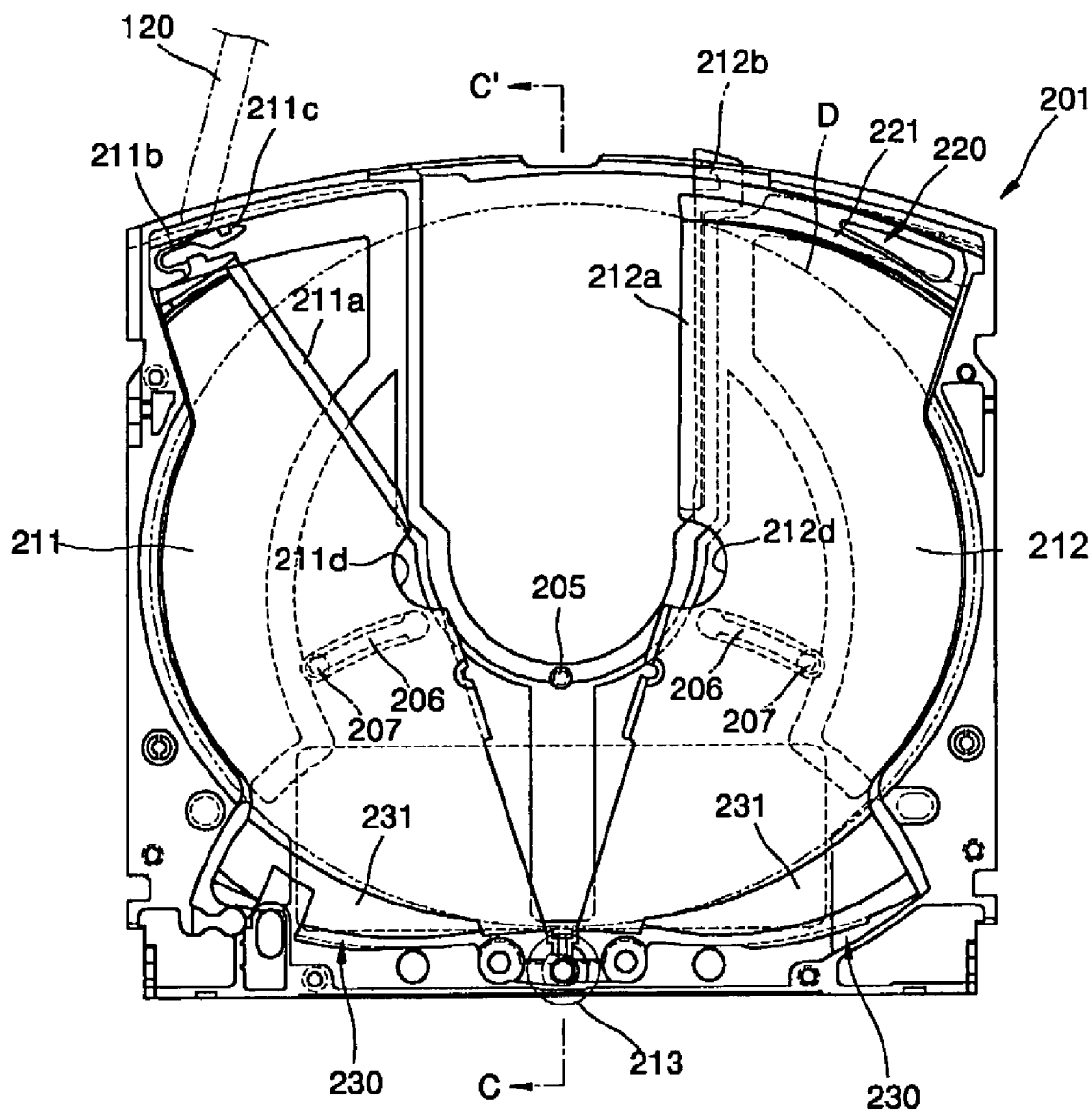
FIG. 6 is a plan view illustrating an opened state of a shutter of the disk cartridge shown in FIG. 3.
Figure 9:
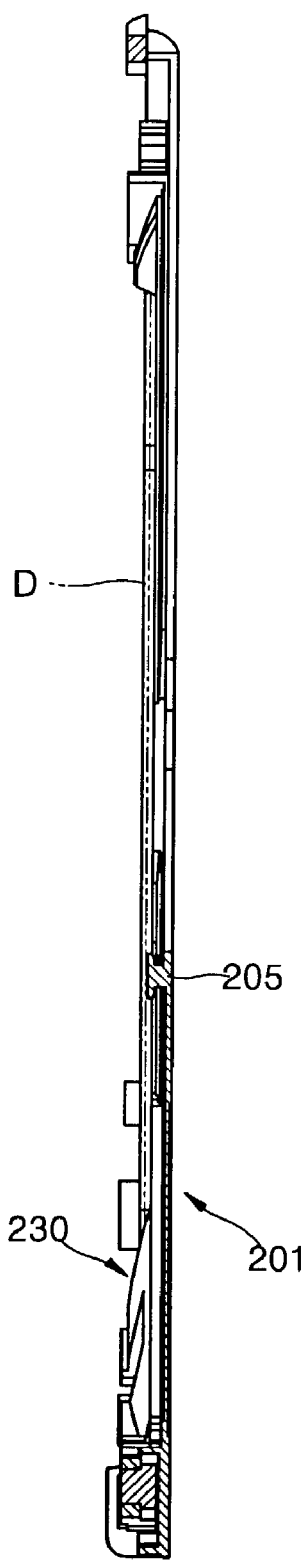
FIG. 9 is a side sectional view of the disk cartridge according to the present invention along a cutting plane line C–C' shown in FIG. 6.

FIGS. 3 and 4 show exploded and assembled perspective views of a disk cartridge according to an embodiment of the present invention. FIGS. 5 and 6 show plan views of the disk cartridge of FIG. 3 to illustrate opened and closed states of a shutter of the disk cartridge of FIG. 3. FIG. 9 shows a sectional view of the disk cartridge along a plane C–C' shown in FIG. 5.

As shown in FIGS. 3 and 4, the disk cartridge comprises a case 201 which stores a disk D, a shutter 210 which is located under the disk D to open and close an aperture 202 of the case 201, and a cover 203 which covers an upper surface of the case 201. For example, an unwoven fabric, as a sealing member 240, may be attached around an opening 203a of the cover 203.

The shutter 210 includes first and second shutter units 211 and 212 which symmetrically rotate in the case 201. Accordingly, where the first and second shutter units 211 and 212 rotate in an opening direction, the aperture 202 is open as shown in FIG. 6. In contrast, where the first and second shutter units 211 and 212 rotate in a closing direction, the aperture 212 is closed as shown in FIG. 5. An interlock saw tooth portion 213 connects and interlocks the first and second shutter units 211 and 212. Consequently, where the first shutter unit 211 rotates, the second shutter unit 212 rotates in a symmetric direction with the first shutter unit 211 due to the interlock saw tooth portion 213. Torsion springs 204 are installed between a surface of the case 201 and the first and second shutter units 211 and 212 to elastically bias the first and second shutter units 211 and 212 in a direction of closing the aperture 202. Thus, where a force applied from an opening lever 120 (refer to FIG. 6) is removed, the torsion springs 204 return the shutter 210 to a closed state.

Protrusion portions 220 and 230 are formed on the first and second shutter units 211 and 212 to contact with a rim portion D3 of the disk D. Here, the disk D is formed of a clamp region D1 at an internal circumference side of the disk D, an information region D2 on which information is recorded, and the outer rim portion D3 at the outside of the information region D2. The protrusion portions 220 and 230 support the rim portion D3 as a non-information region to prevent the contact between the information region D2 and the shutter 210. In addition, the protrusion portions 220 and 230 include slant surfaces 221 and 231 which slant toward a region on which the disk D will be mounted.

Thus, where the first and second shutter units 211 and 212 are closed as shown in FIG. 5, the protrusion portions 220 and 230 support the rim portion D3 of the disk D. However, where the first and second shutter portions 211 and 212 are open as shown in FIG. 6, the disk D is lowered along the slant surfaces 221 and 231 so that a protrusion 205 on the case 201 supports the clamp region D1 of the disk D. As shown in FIG. 5, where the disk D is elevated as the shutter 210 is closed, the rim portion D3 or the information region D2 of the disk D is attached to the sealing member 240, i.e., an unwoven fabric. Accordingly, a gap between the cover 203 and the rim portion D3 of the disk D is blocked to efficiently prevent dust from entering into the disk cartridge. That is, the sealing member 240 may be attached around the opening 203a to correspond to the information region D2, as shown in FIGS. 3 and 4, the rim portion D3, or an area near the clamp region D1 of the disk D, so as to prevent the dust from entering into the disk cartridge. In this case, a soft material, such as rubber, which is elastically transformed by receiving a force from the disk D, can be substituted for the unwoven fabric as the sealing member 240.

Support members 207 are arranged on a lower surface of the first and second shutter units 211 and 212, i.e., the opposite surface from a surface on which the disk D is mounted, and are guided into guide holes 206 on the case 201. Here, the guide holes 206 are formed along a trace of the support members 207 where the first and second shutter units 211 and 212 are rotated. Accordingly, in response to opening and closing the first and second shutter units 211 and 212, the support members 207 slide along the guide holes 206.

Figure 7:
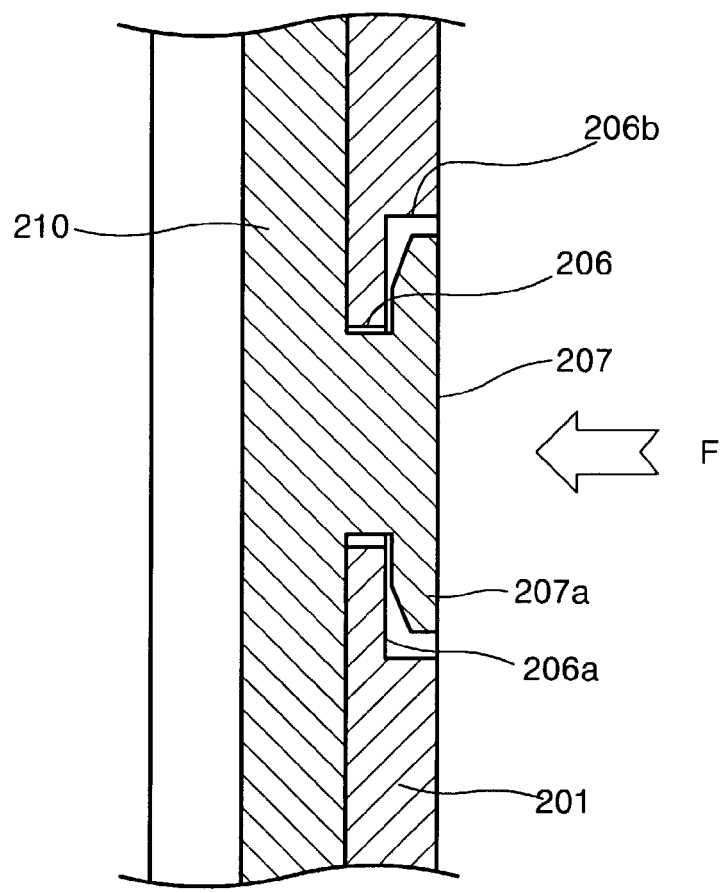
FIG. 7 is a sectional view of the disk cartridge according to the present invention along a cutting plane line A–A' shown in FIG. 5.

FIG. 7 shows a sectional view of the support member 207 along a plane A–A' shown in FIG. 5. As shown in FIG. 7, a peripheral portion 206a of the guide hole 206 interferes with an end 207a of the support member 207 which has passed through the guide hole 206. Accordingly, even where an external force F is applied to the shutter 210 in a direction of an arrow shown in FIG. 7, the shutter 210 is not deformed into the case 201 as the peripheral portion 206a of the guide hole 206 interferes with the end 207a of the support members 207. Here, the end 207a of the support member 207 may be provided to protrude from the case 201. On the other hand, a receiving portion 206b connected to the guide hole 206 may be arranged in the case 201 so as not to have the end 207a of the support member 207 protrude from the case 201.

Figure 8:
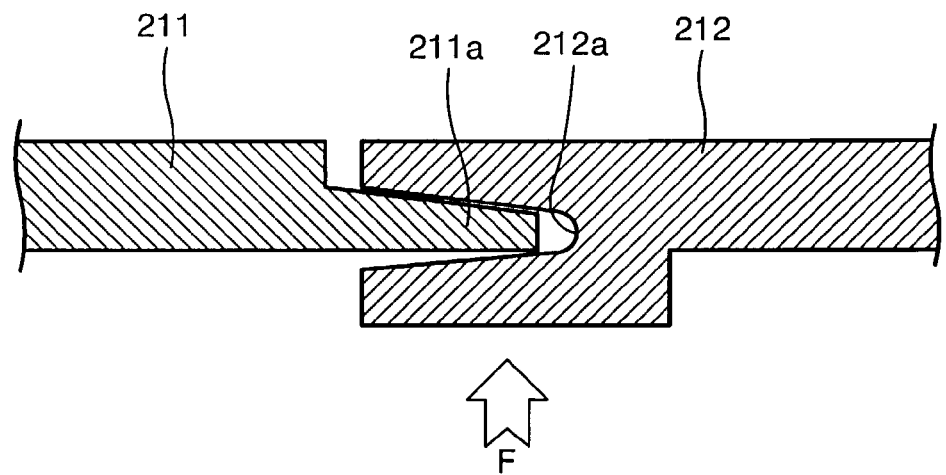
FIG. 8 is a sectional view of the disk cartridge according to the present invention along a cutting plane line B–B' shown in FIG. 5.

FIG. 8 shows a sectional view of the disk cartridge along a plane B–B' shown in FIG. 5. As shown in FIG. 8, a coupling protrusion 211a and a coupling groove 212a are formed at contact portions of the first and second shutter units 211 and 212 to couple each other. The coupling protrusion 211a and the coupling groove 212a integrally combine corresponding upper sides of the first and second shutter units 211 and 212, where the first and second shutter units 211 and 212 are attached to close the aperture 202. Therefore, even where an external force F is applied in a direction of an arrow shown in FIG. 8, the first and second shutter units 211 and 212 are not easily deformed. Since the first and second shutter units 211 and 212 are complementary to each other, a coupling protrusion may be formed on the second shutter unit 212 while a coupling groove may be formed on the first shutter unit 211.

Referring to FIG. 3, the size of the opening 203a of the cover 203 is smaller than the diameter of the disk D to prevent the disk D from being separated through the opening 203a. To replace the disk D, the cover 203 is rotated with respect to a rotation shaft (not shown) to open the cover 203 as shown in FIG. 4. Thereafter, the disk D in the case 201 is withdrawn and a new disk may be mounted in the case 201. As shown in FIGS. 5 and 6, a locking piece 211b is provided on the first shutter unit 211. Here, the locking piece 211 has a locking hook 211c at one end to elastically couple with a locking groove 212b of the second shutter unit 212 in response to closing of the aperture 202.

Hereinbelow an operation of the disk cartridge of FIGS. 3 and 4 will be described with references to FIGS. 5 through 9. The disk cartridge having a disk D is introduced into a disk drive apparatus (not shown) while the shutter 210 and the cover 203 are closed as shown in FIG. 5. Where the disk cartridge is introduced into the disk drive apparatus, the opening lever 120 (refer to FIG. 6) of the disk drive apparatus pushes the locking piece 211b to release the locking hook 211c from the locking groove 212b. Subsequently, the opening lever 120 pushes the locking piece 211b to rotate the first shutter unit 211 in, for example, a counterclockwise direction of FIG. 6. Consequently, the second shutter unit 212 rotates in a clockwise direction by the interlock saw tooth portion 213, thereby opening the aperture 202. In this case, the protrusion portions 220 and 230 of the first and second shutter units 211 and 212 contact the rim portion D3 of the disk D. Thus, the information region D2 on the recording surface of the disk D is not damaged during an opening and closing of the shutter 210.

Where the shutter 210 is open, the disk D is lowered along the slant surfaces 221 and 231 of the protrusion portions 220 and 230 to be temporarily supported by the protrusion 205 and the slant surfaces 221 and 231, as shown in FIGS. 6 and 9. Thereafter, a disk drive turntable (not shown) of the disk drive apparatus may be introduced through the aperture 202 and a damper (not shown) may be introduced through the opening 203a of the cover 203 to clamp the disk D supported by the protrusion 205 and the slant surfaces 221 and 231. Afterwards, the turntable may rotate the disk D to record or reproduce information on and from the disk D.

Where a recording/reproducing operation has been finished and the turntable and the damper have released the disk D, the protrusion 205 and the slant surfaces 221 and 231 support the non-information regions D1 and D3 of the disk, respectively. Where the disk cartridge is withdrawn from the disk drive apparatus, the first and second shutter units 211 and 212 return to the original positions to close the aperture 202. In this case, the rim portion D3 of the disk D is elevated along the slant surfaces 221 and 231 of the protrusion portions 220 and 230 as shown in FIG. 5. Since the shutter 210 does not contact the information region D2 of the disk D in the closing operation, the information region D2 is not damaged. In addition, the rim portion D3 of the disk D may be attached to a peripheral of the opening 203a of the cover 203 with the sealing member 240 therebetween. Accordingly, foreign materials, including dust, is not likely inserted into the disk cartridge through a gap between the disk D and the cover 203.

Moreover, the coupling protrusion 211a and the coupling groove 212a of the first and second shutter units 211 and 212 are coupled where the shutter 210 is closed and the peripheral portions 206a of the guide holes 206 interfere with the ends 207a of the support members 207. Consequently, the shutter 210 is not pushed inside even where the shutter 210 is pushed into the case 201 through the aperture 202. As a result, the shutter 210 is prevented from being deformed and the aperture 202 is firmly closed.

Furthermore, the size of the opening 203a is smaller than the diameter of the disk D and the cover 203 rotates to open and close the case 201. Thus, the disk D is prevented from being separated through the opening 203a without installing separation prevention levers 103a, as shown with the conventional disk cartridge of FIG. 1. It is also understood that openings of various shapes other than a circle can be formed to prevent the separation of the disk D from the disk cartridge.

In addition, the first and second shutter units 211 and 212 include semicircular slits 211d and 212d, respectively, to form a hole at a center of the shutter 210 where the first and second shutter units 211 and 212 are closed. Therefore, to remove the disk D from the disk cartridge, a user may conveniently withdraw the disk D by inserting a finger into the hole of the disk D. In other words, by arranging a hole on the shutter 210, a user may insert a finger deep into the hole of the disk D and bend the finger to conveniently pick up the disk D from the case 201. Alternatively, the semicircular slits 211d and 212d may be eliminated to prevent dust from entering from a lower side of the shutter 210 and attaching to the recording surface of the disk D.

As describe above, the peripherals 206a of the guide holes 206 of the case 201 interfere with the ends 207a of the support members 207 to prevent the shutter 210 from being deformed by an external force, and to firmly close the shutter 210.

Since the shutter 210 in the case 201 contacts only a non-information region of the disk D, the information region D2 of the disk D can be protected during opening and closing operations of the aperture 202.

Additionally, since the rim portion D3 of the disk may be attached to the sealing member 240 at the peripheral of the opening 203a of the cover 203, during the closed state of the shutter 210, a gap between the disk D and the cover 203 is blocked to prevent a recording surface of the disk D from being contaminated by dust or other particles.

Moreover, the cover 203 installed on the case 201 is opened and closed, rotatively, to conveniently replace the disk D from the disk cartridge of present invention. Furthermore, the size of the opening 203a on the cover 203 is smaller than the diameter of the disk D to safely store the disk D without installing the separation prevention members 103a, as with the conventional disk cartridge shown in FIG. 1.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disk cartridge comprising:
a case to store a disk therein and having an aperture to access a portion of the disk;
a cover installed on the case and having an opening;
a shutter movably installed in the case to selectively open and close the aperture formed on the case;
guide holes formed on the case along a movable trace of the shutter; and
support members formed on the shutter to be guided into the corresponding guide holes, wherein the support members include ends thereof which are interfered with by respective peripheral regions of the guide holes in a direction which is parallel to a longitudinal axis of the support members.

2. The disk cartridge of claim 1, wherein the shutter includes:
first and second shutter units which are attached to and separated from each other to open and close the aperture;
a coupling groove formed on one of the first and second shutter units; and
a coupling protrusion formed on the other shutter unit so as to have the coupling protrusion be inserted into the coupling groove to attach the first and second shutter units to each other.

3. The disk cartridge of claim 1, wherein:
the shutter includes protrusion portions which have corresponding slant surfaces at a predetermined angle and support a non-information region of the disk at an external circumference of the disk, and
the disk is lowered along the slant surfaces during an opening operation of the shutter, and elevated along the slant surfaces during a closing operation of the shutter to be removably attached to the opening of the cover.

4. The disk cartridge of claim 3, further comprising a sealing member which is installed on a peripheral of the opening so as to have the disk be removably attached to the sealing member during the closing operation of the shutter.

5. The disk cartridge of claim 4, wherein the sealing member is formed of a material which elastically transforms in response to a force from the disk.

6. The disk cartridge of claim 5, wherein the sealing member is formed of one of an unwoven fabric and a rubber.

7. The disk cartridge of claim 1, wherein the cover is installed on the case to rotatably open and close the case.

8. The disk cartridge of claim 7, wherein the opening has an area smaller than that of the disk.

9. The disk cartridge of claim 3, further comprising a protrusion which is formed on the case so as to support a non-information region of the disk at an inner circumference of the disk, where the disk is lowered along the slant surfaces of the shutter.

10. The disk cartridge of claim 1, wherein the guide holes support and guide the shutter along moving directions of the shutter.

11. The disk cartridge of claim 1, wherein the interference of the ends of the support members and the corresponding guide holes prevent deformation of the shutter with respect to the case.

12. The disk cartridge of claim 1, wherein the guide holes interact with the corresponding support members so as to limit moving directions of the shutter to one axis.

13. The disk cartridge of claim 1, further comprising a protrusion which is formed on the case and supports a non-information region of the disk at an inner circumference of the disk, where the disk is lowered along slant surfaces of the shutter.

14. The disk cartridge of claim 2, wherein the first shutter unit is integrally connected to the second shutter unit in response to the coupling protrusion being inserted into the coupling groove.

15. The disk cartridge of claim 2, wherein the insertion of the coupling protrusion to the coupling groove prevents deformation of the first shutter unit with respect to the second shutter unit.

16. The disk cartridge of claim 2, wherein the first and second shutter units include corresponding semicircular slits which from a hole at a center of the shutter where the first and second shutter units are attached to each other.

17. A disk cartridge comprising:
a case to store a disk therein and having an aperture to access a portion of the disk;
a cover installed on the case and having an opening;
a shutter movably installed in the case to selectively open and close the aperture formed on the case;
guide holes formed on the case along a movable trace of the shutter; and
support members formed on the shutter to be guided into the corresponding guide holes, wherein the support members include ends thereof which are interfered with by respective peripheral regions of the guide holes, wherein the shutter includes first and second shutter units which are attached to and separated from each other to open and close the aperture, a coupling groove formed on one of the first and second shutter units, and a coupling protrusion formed on the other shutter unit so as to have the coupling protrusion be inserted into the coupling groove to attach the first and second shutter units to each other, and wherein the disk cartridge further comprises:
elastic members which normally bias the first and second shutter units to close the aperture;
rotating shafts formed on the case so as to provide a rotating axis of the corresponding first and second shutter units; and
interlocking saw tooth portions provided to corresponding ends of the first and second shutter units, wherein the interlock saw tooth portions connect and interlock the first and second shutter units so as to have one of the first and second shutter units rotate in a symmetrical direction with the other shutter unit.

18. A disk cartridge comprising:
a case to store a disk therein and having an aperture to access a portion of the disk;
a cover installed on the case and having an opening;
a shutter movably installed in the case to selectively open and close the aperture formed on the case and having slant surfaces at predetermined portions thereof;
guide holes formed on the case along a movable trace of the shutter; and
support members formed on the shutter to be guided into the corresponding guide holes, wherein the support members include ends thereof which are interfered with by respective peripheral regions of the guide holes in a direction which is parallel to a longitudinal axis of the support members.

19. The disk cartridge of claim 18, wherein:
the disk is lowered and elevated along the slant surfaces of the shutter so as to prevent contact between the shutter and an information region of the disk, and
the interference of the ends of the support members and the corresponding guide holes prevents deformation of the shutter with respect to the case.

20. The disk cartridge of claim 18, further comprising a sealing member installed on a peripheral region of the opening so as to have the disk be removably attached to the sealing member during a closing operation of the shutter and prevent foreign particles from entering therethrough.

21. The disk cartridge of claim 18, wherein the shutter includes:
first and second shutter units which are attached to and separated from each other to open and close the aperture;
a coupling groove formed on one of the first and second shutter units; and
a coupling protrusion formed on the other shutter unit so as to have the coupling protrusion be inserted into the coupling groove to attach the first and second shutter units to each other, wherein the insertion of the coupling protrusion to the coupling groove prevents deformation of the first shutter unit with respect to the second shutter unit.

22. A disk cartridge including a case having an aperture to allow access to a disk, the disk cartridge comprising:
a shutter in the case to open and close the aperture;
a guide hole in the case located along a tracing of a point of the shutter, the guide hole including opposing peripheral regions along at least a portion thereof; and
a support member on the shutter to be inserted into the guide hole, including an end having a diameter that is wider than a distance between the opposing peripheral regions of the guide hole, wherein when the support member is guided by the guide hole the shutter opens and closes the aperture and the end of the support member is interfered with by respective peripheral regions of the guide hole in a direction which is perpendicular to the direction of movement of the support member through the guide hole.

* * * * *